Patented Mar. 6, 1934

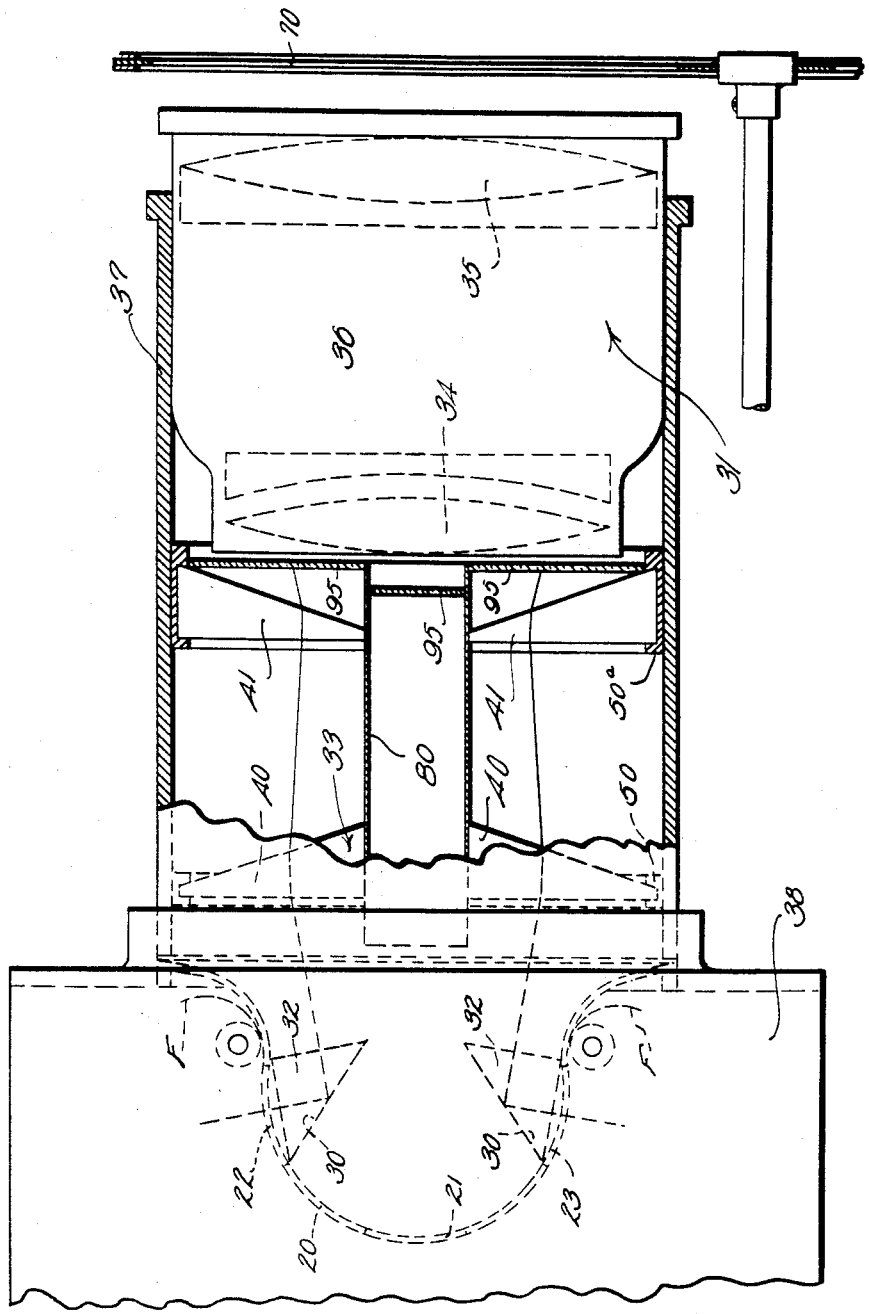

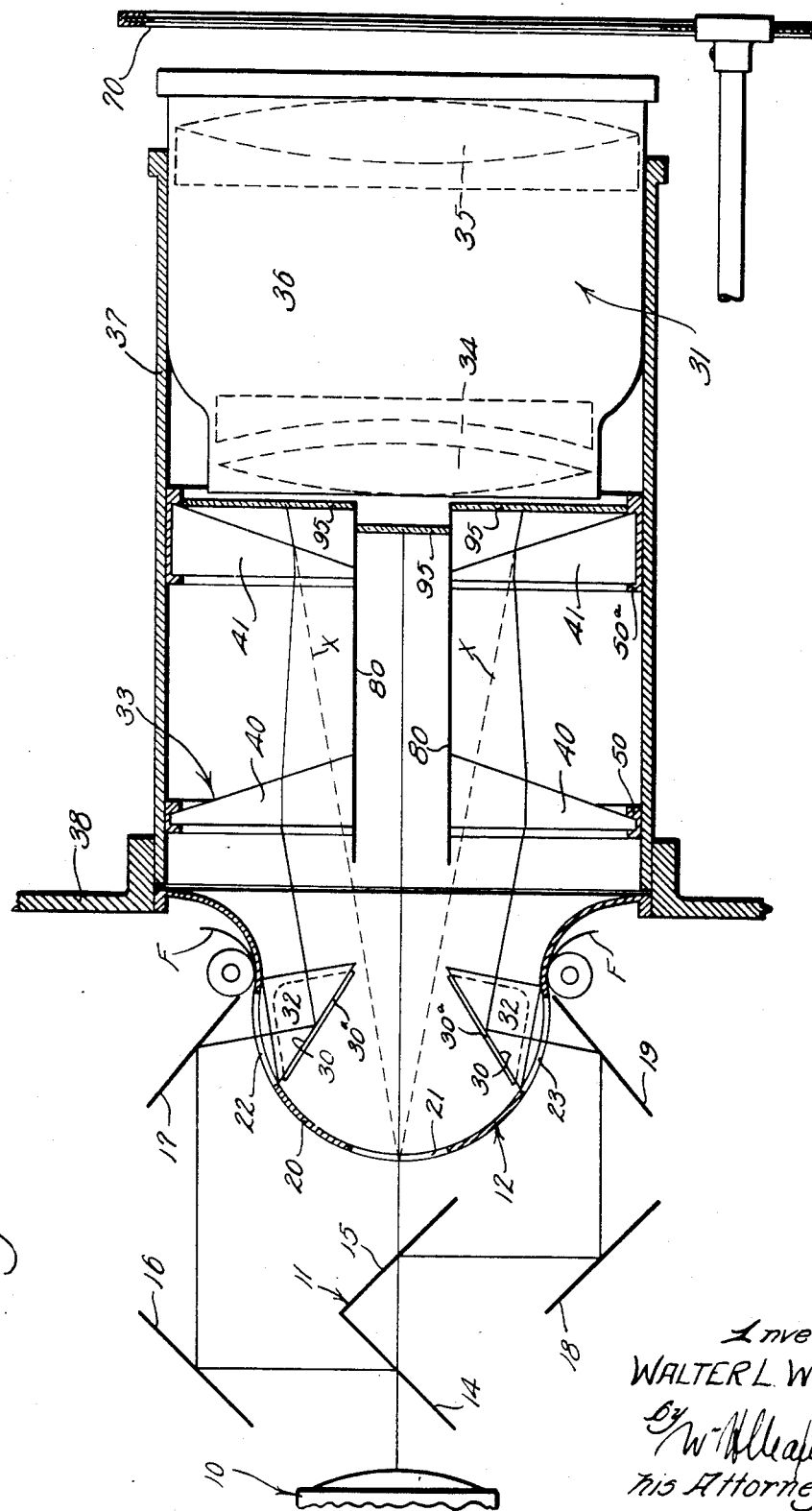

1,949,893

UNITED STATES PATENT OFFICE 1,949,893

OPTICAL SYSTEM

Walter L. Wright, Santa Monica, Calif., assignor to Synchrome Corporation, Los Angeles County, Calif., a corporation of California Application November 22, 1929, Serial No. 408,980
Renewed August 8, 1933

8 Claims. (Cl. 88—16.4)

This invention relates to an optical system for use in projecting motion pictures, and it relates to an optical system particularly useful for projecting a plurality of pictures simultaneously so that they fall upon a screen in perfect register.

The present invention is particularly useful in handling film on which the pictures are in sets or groups, each group including a plurality of pictures of different color values of a subject taken simultaneously from a common point of vision. Particular reference will be made to the invention as applied to a film of the character stated in which the several pictures of each group are spaced apart longitudinally of the film and the groups arranged on the film so that they overlap, that is, so that the spaces between pictures of each group are occupied by pictures of adjoining groups. It is to be understood, of course, that this specific form of film is referred to merely for purpose of example and to facilitate an understanding of the invention, and therefore is not to be construed as a limitation or restriction upon the invention.

A primary object of this invention is to provide an optical system for projecting a plurality of pictures carried on a film, or the like, through a single lens to fall on a screen in register.

Another object of the invention is to provide an optical system of the character mentioned employing a lens of ordinary size, that is, a lens that is practical and economical, making the system suitable for commercial use.

It is a further object of the present invention to provide an optical system for projecting pictures in the manner above referred to which provides for adjustment or varying of the pictures to bring them into perfect register on the screen.

The various objects and features of my invention will be best and more fully understood from the following detailed description of a typical form and application of the invention, throughout which description reference is had to the accompanying drawings, in which:

Fig. 1 is a side elevation of a picture projecting apparatus embodying the present invention, showing certain parts broken away to show in cross section, and Fig. 2 is a diagrammatic view illustrating the invention.

The present invention is particularly useful in handling a motion picture film F in which the pictures are in groups or sets, each group comprising several, say, three pictures of a subject, taken simultaneously from a common point of vision, the several pictures being of different chromatic values of the subject, say for example, violet, green and orange. In accordance with the broader principles of the invention, the pictures of each series may be in adjoining relation or may be spaced apart. For purpose of example and to facilitate an understanding of the invention, I will refer to a practical arrangement in which the pictures of each series are spaced apart distances corresponding to a single picture area and adjoining series are meshed or overlapped so that the spaces between pictures of each series are occupied by pictures of adjoining series.

The present invention is concerned primarily with an optical system handling the light directed through the pictures so that it is effectively projected onto a screen. I will, for purpose of clarity, make reference to a means of directing light through the pictures, and in this connection will make reference to subject matter which is fully set forth and claimed in my co-pending application Serial No. 390,121, filed Sept. 3, 1929, entitled Motion picture projector.

The arrangement for directing light through the pictures on the film F includes, generally, a source of light 10, light dividing means 11 operable to receive a shaft of light from the source 10 and divide it into a plurality of spaced shafts to be projected through the several pictures of a group on the film F while the film F is held or carried by a film handling means 12 so that the pictures are in a predetermined position.

The source of light 10 may be of the type ordinarily employed in motion picture apparatus; for instance, it may be an ordinary arc lamp including a suitable arrangement of reflector and condenser lenses, etc.

The means 11, which I have shown for dividing the light from the source 10 into a plurality of shafts to pass through the film, includes two light dividers 14 and 15 angularly arranged one behind the other in the path of the shaft of light from the source 10, a first reflector 16 receiving light reflected by the divider 14, a second reflector 17 receiving light from the first reflector and directing it through the film F, a first reflector 18 receiving light reflected by the divider 15, and a second reflector 19 receiving the light from the reflector 18 and directing it through the film F. The first light divider 14 is arranged at an angle, say at 45 degrees, across the shaft of light from the source 10, and operates to pass part of the light and reflect off part of the light at an angle, say, upwardly. The second light divider 15 is arranged at an angle, say, at 45 degrees, in the path of the shaft of light passed by the first light divider and passes part of the light and projects off the light that is not passed, at an angle, say, downwardly. The two reflectors 16 and 18 receive the shafts of light reflected upwardly and downwardly by the dividers 14 and 15, respectively, and reflect them forward or in the general direction of the shaft projected by the source of light 10. The second reflectors 17 and 19 receive the reflected shafts and direct them inwardly and forwardly so that they converge and are projected toward a center coincident with a shaft of light projected by the source 10.

The film handling means 12 operates to hold the film F so that the portion carrying the group of pictures to be projected is curved about the center toward which the shafts of light are projected by the reflectors 17 and 19.

The means 12 may vary in construction, it being preferred to employ a construction such as is set forth and claimed in my co-pending application Serial No. 308,241, filed September 25, 1928, entitled Construction for cameras, projectors, etc. Further, it is to be understood that the means 12 may be incorporated or arranged in combination with any suitable means for intermittently advancing the film to bring successive groups of pictures into position for projection.

For purpose of illustration I have shown the film arranged over an annular guide plate 20 with three apertures 21, 22 and 23. The aperture 21 is in line with the shaft of light coming directly from the source 10 after having passed the dividers 14 and 15. The aperture 22 is in the path of light being reflected by reflector 17, and the aperture 23 is in the path of light reflected by the reflector 19. The apertures 21, 22 and 23 are spaced and proportioned to register with the several pictures of a group on the film F.

In practice the film handling means includes a suitable feed sprocket or other means for advancing the film in proper time relation to a shutter 70. For purpose of simplicity I have omitted the film advancing device from the drawings.

Although I have referred specifically to the projection of light from a single source through the several apertures, it is to be understood that the present invention is in no way concerned with the details of this arrangement, it being obvious that individual sources of light may be employed for projection through the apertures, if it is so desired.

The present invention is concerned with the handling of the light directed through the apertures 21, 22 and 23 so that the images or pictures through which the light has been projected are thrown upon a screen effectively, efficiently and without distortion. Broadly, the invention provides for directing the light projected through the apertures 22 and 23 so that it passes through a lens the same as though it came directly from the aperture 21. The form of the invention illustrated includes or provides reflectors 30, arranged in the paths of the shafts of light directed through the apertures 22 and 23 to intercept the light before it reaches the center about which the film is curved, and a single lens device 31 which receives the light projected through all three apertures to throw it onto a screen. The particular form of the invention illustrated has the reflectors 30 arranged to reflect off the light passed through the apertures 22 and 23 in the general direction of the lens device 31 but not in a manner to properly fall upon a lens of reasonable size, and it provides means for handling the reflected light so that it properly enters the lens device.

The reflectors 30 are arranged immediately within the guide plate 20, and in the case illustrated are formed by the back surface of prisms 32. The prisms are formed so that the surfaces or faces through which the light enters and leaves are at right angles to the light so that there is no dispersion or distortion of the light because of the prisms. It is to be particularly noted that the prisms 32 are related so that they are in the paths of the shafts of light projected through the apertures 22 and 23 but are spaced apart or away from the central axis of the optical system so that they do not materially interfere with light projected through the middle aperture 21 in the plate 20. In practice the reflectors 30 may be held in suitable carriers 30ᵃ which are adjustably mounted in the casing of the apparatus to allow for suitable shifting or adjusting of the reflectors. It will be obvious that tilting or varying of the angle of the reflectors will vary or change the angle of which the reflected shafts are directed towards the lens device.

The lens device 31 is located a suitable distance from or ahead of the guide plate 20, and in practice may include a suitable arrangement or combination of lenses adapted to direct the light onto a screen in the proper manner. For purpose of example it may be considered that the lens device includes an arrangement of lenses such as is ordinarily found in a projector lens, that is, a back combination 34 and a front combination 35. The lens device may be housed or mounted in any suitable manner; for instance, the lenses may be in a carrier or barrel 36 adjustably supported in an extension 37 of the projector case 38.

The means 33, provided for handling the light reflected by the reflectors 30 so that it enters the lens 31 in the desired manner, comprises light handling means which operate to offset inwardly the shafts of light reflected by the reflectors 30. In the particular form of the invention illustrated the means 33 includes two prisms 40 and 41 in the path of light reflected by each reflector 30. The first prism 40 receives the light from the reflector 30 and bends or deflects it inwardly with reference to the axis of the optical system, while the second prism receives the light from the first prism and deflects or bends it outwardly so that it continues in the direction in which it was originally reflected by the reflector 30 but is offset inwardly to fall upon or into the field of the lens 31.

I make the two prisms 40 and 41 of equal angularity to avoid prismatic dispersion of the light falling upon the lens. The desired offsetting of the light reflected by a reflector 30 to cause it to properly fall in the lens device 31 is accomplished through making the prisms 40 and 41 of suitable angularity and by spacing them apart in the proper manner. Further, it is an important feature of the present invention that the means 33 operate to offset or influence the light reflected by the reflectors so that it falls upon the lens device 31 as though it were projected through the center aperture 21. In other words, the means 33 operates to offset the shafts reflected by the reflectors 30 so that when they enter the lens device 31 their axes are positioned to intersect the center of the picture at the central aperture 21. This feature of the invention will be apparent from examination of Fig. 2, and this alignment is illustrated by the lines marked "X".

In practice the means 33 may be mounted in various manners, in fact the mountings employed in any specific case will depend more or less upon the particular mechanical form of parts employed in the means 33. In the case where I employ two prisms 40 and 41 as I have above described, I may arrange the prisms 40 and 41 in carriers 50 and 50ª respectively, mounted within the casing extension 37. The carriers 50 and 50ª may be slidably and rotatably mounted in the casing extension 37. By rotating the carriers, the projected pictures may be adjusted into true or perfect vertical alignment.

It is to be understood, of course, that the projector will in practice be provided with suitable means for interrupting the light in synchronism with movement of the film so that the light to the screen is interrupted except when the film is stationary. In the diagram in Fig. 2 I have illustrated a suitable shutter 70 in front of the lens device 31.

In practice suitable shields 80 may be provided to prevent any interference between the light projected through the center aperture 21 and that projected through the end apertures 22 and 23. Further, it will be obvious that suitable color filters may be provided to chromatically influence the light projected through the several apertures. In the drawings I have shown color filters 95 located to influence the shafts of light before they enter the lens device.

From the foregoing description it will be apparent that I have provided an optical system for handling the light projected through three spaced pictures on the film F so that the three shafts are handled or projected by a single lens exactly the same as though they were all projected through a single aperture or picture at the film. In practice in employing standard motion picture film F and the standard size of pictures on the film F, the lens device 31 need be only slightly larger, than that ordinarily employed in motion picture projectors.

Having described only a typical, preferred form and application of my invention, I do not wish to limit myself to the specific details set forth, but wish to reserve to myself any changes or variations that may appear to those skilled in the art or fall within the scope of the following claims.

Having described my invention, I claim:

1. An optical system for directing a plurality of convergent shafts of light projected through a film at spaced apertures including, a lens directly in the path of a shaft of light from one aperture, a reflector receiving a shaft of light from another aperture and directing it in the direction of the lens to be divergent relative to the first mentioned light shaft and means between the reflector and lens offsetting the reflected shaft of light inwardly toward the first mentioned shaft to pass through the lens and so that its axis intersects the axis of the first mentioned shaft at the film.

2. An optical system for directing a plurality of convergent shafts of light projected through a film at spaced apertures including, a lens directly in the path of a shaft of light from an aperture, a reflector receiving a shaft of light from another aperture and directing it in the direction of the lens and in divergence to the first mentioned shaft, and prismatic means between the reflector and lens offsetting the reflected shaft of light inwardly toward the first mentioned shaft to pass through the lens and so that its axis intersects the axis of the first mentioned shaft at the film.

3. An optical system for directing a plurality of convergent shafts of light projected through a film at spaced apertures including, a lens directly in the path of a shaft of light from one aperture, a reflector receiving a shaft of light from another aperture and directing it in the direction of the lens and in divergence to the first mentioned shaft, and means offsetting the reflected shaft of light inwardly toward the first mentioned shaft to pass through the lens and so that its axis intersects the axis of the first mentioned shaft at the film, said means including a pair of like prisms between the reflector and lens.

4. An optical system for directing a plurality of shafts of light projected through a film at spaced gates toward a common center including, a lens directly in the path of the shaft of light from the middle aperture, reflectors arranged in the paths of the shafts of light from the end apertures to reflect off said end shafts toward the lens and divergent to the middle shaft, and means between the reflectors and lens offsetting the reflected shafts inwardly toward the middle shaft to pass through the lens so that their axes intersect the middle shaft at the film, including prisms in the path of each end reflected shaft.

5. An optical system for directing a plurality of shafts of light projected through a film at spaced apertures toward a common center including, a lens directly in the path of the shaft of light from the middle aperture, reflectors arranged in the paths of the end shafts of light from the end apertures to reflect off said end shafts toward the lens and divergent to the middle shaft, and means between the reflectors and lens offsetting the reflected shafts inwardly toward the middle shaft to pass through the lens and so that their axes intersect the middle shaft at the film, said means including a pair of prisms in the path of each reflected shaft of light, and shields between the middle shaft and the reflected shafts.

6. An optical system for diverting a plurality of shafts of light projected through a film at spaced apertures toward a common center including, a lens directly in the path of the shaft of light from the center aperture, reflectors arranged in the paths of the shafts of light from the end apertures to reflect off said end shafts toward the lens and divergent to the middle shaft, and prismatic means between the reflectors and lens offsetting the reflected shafts inwardly toward the middle shaft to pass through the lens and so that their axes intersect the middle shaft at the film, said means including spaced prisms in the path of each reflected shaft.

7. An optical system for directing a plurality of shafts of light projected through a film at spaced apertures toward a common center including, a lens directly in the path of the shaft of light from the middle aperture, reflectors arranged in the paths of the shafts of light from the end apertures to reflect off said end shafts toward the lens and divergent to the middle shaft, and means between the reflectors and lens offsetting the reflected shafts inwardly toward the middle shaft to pass through the lens and so that their axes intersect the middle shaft at the film, said means including pairs of like prisms in the path of each reflected shaft.

8. An optical system for directing a plurality of shafts of light projected through a film through spaced apertures toward a common center including, a lens directly in the path of the shaft of light from the middle aperture, reflectors arranged in the paths of the shafts of light from the end apertures to reflect off said end shafts toward its lens and divergent to the middle shaft, and means between the reflector and lens offsetting the reflected shafts inwardly toward the middle shaft and so that their axes intersect the middle shaft at the film, said means including pairs of prisms, in the path of each reflected shaft, the prisms of each pair being alike.

WALTER L. WRIGHT.